Dec. 13, 1938. G. SUNDBACK 2,140,463
METHOD OF MANUFACTURING SEPARABLE INTERLOCKING FASTENERS
Original Filed Aug. 17, 1933
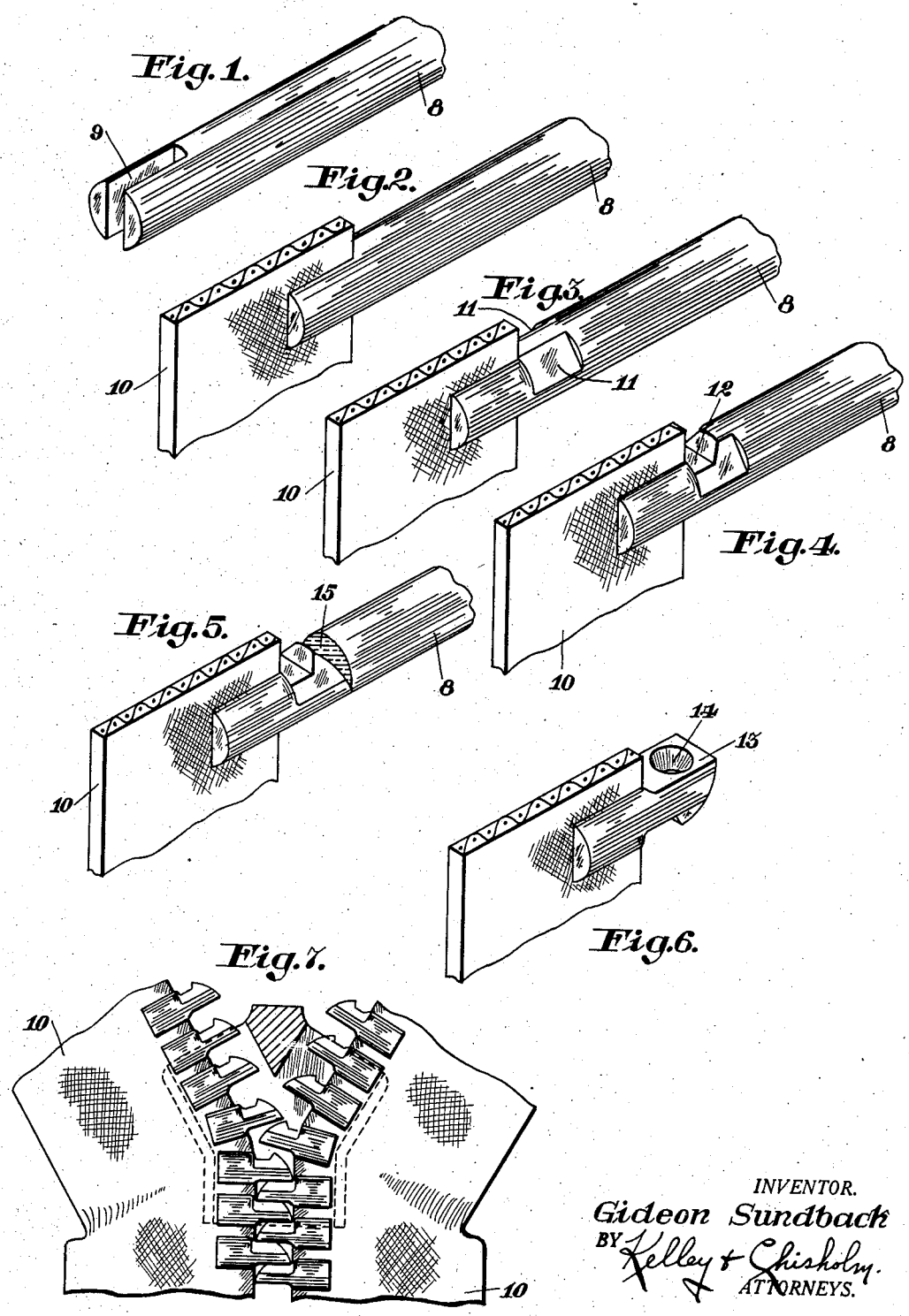
INVENTOR.
Gideon Sundback
BY Kelley & Chisholm
ATTORNEYS.

Patented Dec. 13, 1938

2,140,463

UNITED STATES PATENT OFFICE 2,140,463

METHOD OF MANUFACTURING SEPARABLE INTERLOCKING FASTENERS

Gideon Sundback, Meadville, Pa., assignor to Talon, Inc., a corporation of Pennsylvania Application August 17, 1933, Serial No. 685,601
Renewed May 7, 1938

3 Claims. (Cl. 18—59)

My invention relates to a method of manufacturing separable interlocking fasteners.

The invention aims particularly to provide a simple and economical method of manufacturing fasteners in which the fastener elements are made from non-metallic material. Although any suitable material in the plastic class may be used, I prefer to employ a cellulose acetate or cellulose nitrate material, such as pyralin. These materials can be readily softened by a solvent, sufficiently to cause them to adhere to the fabric which assists in sticking them on the flexible supports.

According to methods heretofore proposed for making separable interlocking fasteners, from non-metallic materials, it was necessary to have an accurately dimensioned strip of material from which the fastener elements could be cut, and the shape of the strip was irregular in outline so that it was impossible to obtain the material by an extrusion process. It has been found that materials suitable for the purpose can be obtained in round sections in continuous lengths by extrusion and that the tolerances on such round stock are within the range of permissible tolerances on the fastener elements. It is accordingly the main object of my invention to provide a method whereby round material can be utilized in making the individual fastener elements.

In the accompanying drawing I have shown for purposes of illustration one embodiment which the invention may assume in practice. In the drawing:

Fig. 1 shows the round wire after the first operation;

Fig. 2 shows the placing of the tape in the slot at the end of the wire;

Figs. 3, 4 and 5 illustrate successive operations required for shaping the interlocking head and severing from the wire;

Fig. 6 illustrates the formation of the recess of the interlocking head; and

Fig. 7 shows a completed fastener.

In carrying out my invention a round wire 8 having a diameter equal to the desired transverse thickness of the fastener element is provided in continuous lengths. The end of the wire is faced off square and is fed to a high-speed saw or milling cutter which forms the slot 9 extending across the diameter of the wire and longitudinally into the wire the desired distance to form a sufficient attaching surface for receiving the tape. At this point or at some subsequent point the strip is fed endwise into engagement with a flexible carrier. Preferably the slotted end of the wire is fed astride the edge of a flexible tape carrier 10 and the slot is of such width that it will fit closely on the edge of the tape and hold the light weight fastener elements by friction until they can be firmly stuck in position. In Figs. 3 and 4 the angular notches 11 and the notch 12 across the top of the wire may be easily formed by suitable cutting tools. The flat surface 13 and the recess 14 may be formed simultaneously by a suitable rotary cutting tool. The fastener element is just right for cutting off the wire as indicated at Fig. 5. The cutting tool for the purpose preferably makes a V-shaped notch 15 so that the end face of the fastener element may be inclined while the remaining face of the wire is left square.

The above operations are performed in sequence it being understood that suitable means will be provided for feeding the tape accurately the required distance to place the fastener elements uniformly along the edges of the tape. The affixing of the fastener elements to the tape can be accomplished by dipping the assembly in a suitable solvent provided the fastener members are made from soluble material. If desired suitable cement or glue may be used or in some instances, heat may be applied to soften the elements. This method of attaching the fastener elements is more fully disclosed and claimed in the patent to Corner No. 1,920,138.

While I have shown and described in this application one embodiment which my invention may assume in practice, it will be understood that this embodiment is only for the purposes of illustration and that other forms may be devised within the scope of the appended claims.

What I claim as my invention is:

1. The method of making separable interlocking fasteners of the class described having elements each with a slotted portion at one end and an interlocking head portion at the other end, which comprises forming a tape engaging portion at the extreme end of the rod, attaching such portion to the edge of a tape, forming the interlocking portion of the element on that portion of the strip adjacent the tape, and severing the element thus formed from the rod.

2. The method of making separable interlocking fasteners of the class described, having elements each with a slotted portion at one end and an interlocking head portion at the other end, which comprises cutting material from a rod of uniform cross-section to form a slot at the extreme end of the strip and extending longitudinally of the strip, attaching the slotted end of said strip astride the edge of a carrier, completing the formation of the element by cutting material from the rod to form the interlocking head portion and then severing from the strip, and intermittently advancing the carrier between successive feeding and cutting operations on the rod to space the elements apart on the carrier.

3. The method of making separable interlocking fasteners of the class described, having elements each with a slotted portion at one end and an interlocking head portion at the other end, which comprises cutting a slot diametrically across the end of a round rod, attaching such slotted end astride the edge of a carrier, and forming the interlocking head portion from material adjacent said slotted portion and severing the elements so formed from the rod.

GIDEON SUNDBACK.